Nov. 19, 1935.  L. K. ANDERSON  2,021,495
BEVERAGE MIXER AND COOLER
Filed Oct. 23, 1934
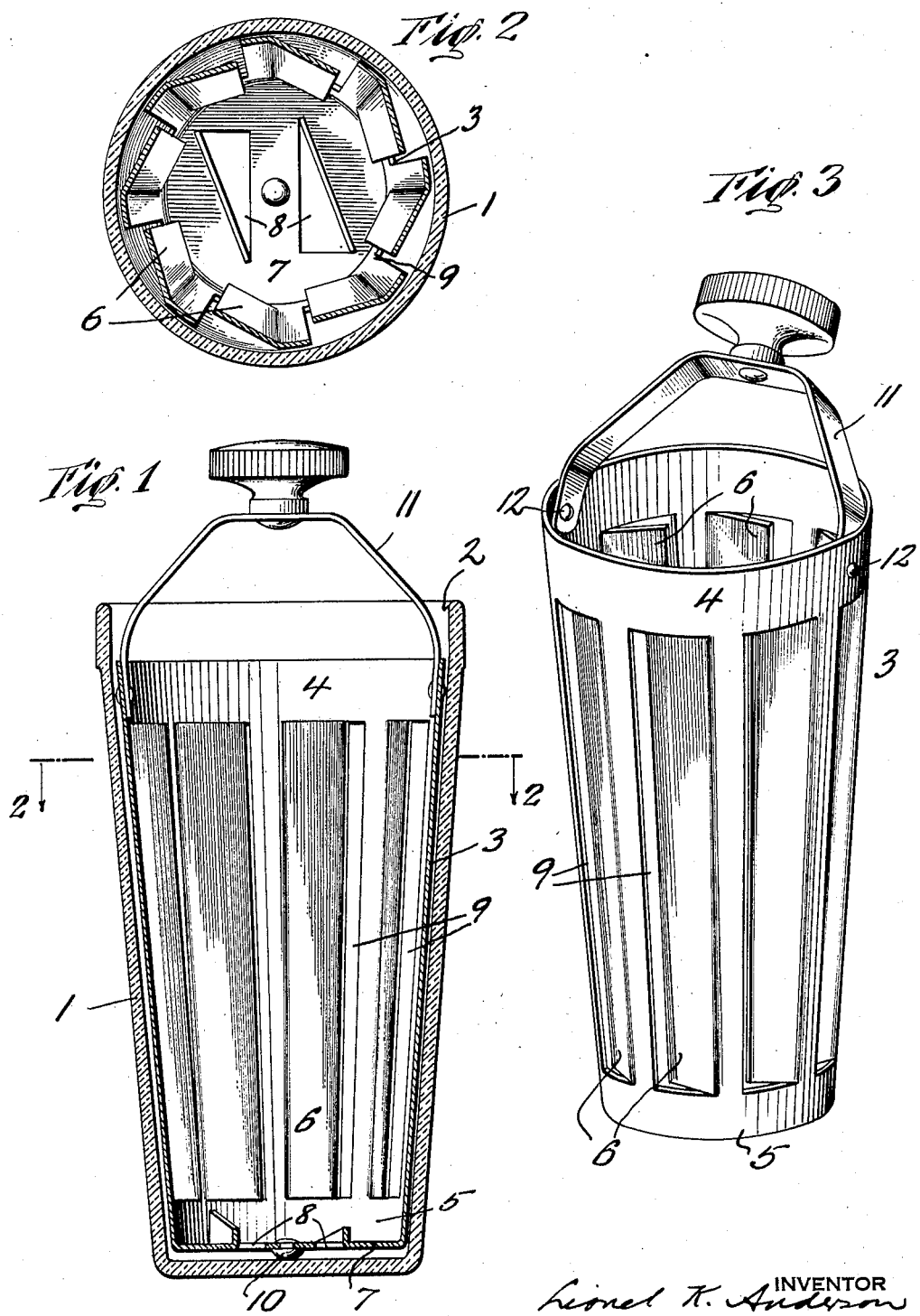
INVENTOR
Lionel K. Anderson
BY
ATTORNEY Patented Nov. 19, 1935

2,021,495

UNITED STATES PATENT OFFICE 2,021,495

BEVERAGE MIXER AND COOLER

Lionel K. Anderson, Great Neck, N. Y., assignor of one-half to Harold M. Vandenhove, Manhasset, N. Y.

Application October 23, 1934, Serial No. 749,562

2 Claims. (Cl. 259—50)

This invention relates to beverage mixers and coolers and is intended to supersede the well-known cocktail shaker. The main object and feature of the invention is to obviate the necessity of the vigorous and fatiguing shaking now found necessary in order to mix and cool the cocktail. Another feature of the invention is to prevent undue dilution of the beverage caused by the fact that the ice now remains in the shaker after the beverage has been sufficiently mixed and cooled and therefore tends to dilute the beverage unduly unless the said beverage is immediately removed from the cocktail shaker.

In the accompanying drawing the invention is shown in a preferred and concrete form in which:

Fig. 1 is a vertical sectional view of a mixer and cooler embodying the invention;

Fig. 2 is a horizontal sectional view substantially on the plane of line 2—2 of Fig. 1; and Fig. 3 is a perspective view of the removable shell.

1 indicates a liquid container of suitable form and material, here of tapering cylindrical shape as shown and having an open mouth 2. 3 is an ice-holding shell of sheet material and of a configuration to fit closely within container 1 so that it may be rotated back and forth while retaining its upright position within the container. The shell consists here essentially of an upper and a lower ring 4 and 5 between which extend inwardly projecting fins 6, together with a bottom 7 having openings 8. Preferably, the rings and fins are made out of a single piece of metal, the side wall of which is struck up to form fins 6 and to leave openings 9. Preferably also, the fins are arranged non-radially as shown. To facilitate the back and forth twirling operation, the bottom of the shell may have a center-support or bearing 10, and adjacent the open top of the shell is arranged a handle 11, which handle can be pivotally supported as at 12 to more easily allow ice-cubes to be introduced into the shell.

The ice can, of course, be placed in the cage before the latter is inserted into the container, but a convenient method of operation is to place the shell in the container, then to introduce the beverage to be mixed or cooled, after which the ice can be placed in the shell, the handle being placed in a tilted position to facilitate the introduction of the ice. The handle is now moved into an upright position and the shell rotated back and forth thereby causing the liquid to flow over the surface of the ice thus mixing and cooling the beverage. The ice-holding cage or shell is now removed, the beverage draining off into the container, while the ice is lifted out with the shell. If desired the usual strainer top can now be placed upon the open mouth of the container and the contents poured out.

I claim:

1. A beverage mixer and cooler including: a liquid container open at the top; and an open-top ice-holding shell removably seated within said container, capable of being oscillated back and forth at the will of the operator and self-draining of its liquid contents upon removal from the container, said shell resting loosely on the bottom of the container and maintained in upright and freely rotatable position by contact with the container walls, said shell having projecting agitating fins and openings permitting free flow of liquid to and from the shell.

2. A beverage mixer and cooler including: a liquid container open at the top; an open-top ice-holding shell removably seated within said container, capable of being oscillated back and forth at the will of the operator and self-draining of its liquid contents upon removal from the container, said shell resting loosely on the bottom of the container and maintained in upright and freely rotatable position by contact with the container walls, said shell having projecting agitating fins and openings permitting free flow of liquid to and from the shell; and a handle extending across the open top of the shell and adjustable to a non-obstructing position to admit of the introduction of ice into the shell.

LIONEL K. ANDERSON.